(12) United States Patent
Sauty et al.

(10) Patent No.: US 10,836,841 B2
(45) Date of Patent: Nov. 17, 2020

(54) PROCESS FOR PRODUCING EPOXIDIZED POLYMERS

(71) Applicant: COOPER TIRE & RUBBER COMPANY, Findlay, OH (US)

(72) Inventors: Nicolas Sauty, Perrysburg, OH (US); Howard Colvin, Wayne, OH (US)

(73) Assignee: Cooper Tire & Rubber Company, Findlay, OH (US)

( * ) Notice: Subject to any disclaimer, the term of this patent is extended or adjusted under 35 U.S.C. 154(b) by 44 days.

(21) Appl. No.: 16/091,431

(22) PCT Filed: Apr. 4, 2017

(86) PCT No.: PCT/US2017/025857
§ 371 (c)(1),
(2) Date: Oct. 4, 2018

(87) PCT Pub. No.: WO2017/176686
PCT Pub. Date: Oct. 12, 2017

(65) Prior Publication Data
US 2019/0127495 A1  May 2, 2019

Related U.S. Application Data

(60) Provisional application No. 62/318,387, filed on Apr. 5, 2016.

(51) Int. Cl.
| | | |
|---|---|---|
| *C08C 19/06* | (2006.01) | |
| *B60C 1/00* | (2006.01) | |
| *C08L 91/06* | (2006.01) | |
| *C08F 136/06* | (2006.01) | |
| *C08L 15/00* | (2006.01) | |
| *C08L 91/00* | (2006.01) | |
| *C08F 136/08* | (2006.01) | |
| *C08L 7/00* | (2006.01) | |
| *C08L 9/00* | (2006.01) | |
| *C08F 8/08* | (2006.01) | |

(52) U.S. Cl.
CPC ............. *C08C 19/06* (2013.01); *B60C 1/00* (2013.01); *C08F 136/06* (2013.01); *C08F 136/08* (2013.01); *C08L 7/00* (2013.01); *C08L 9/00* (2013.01); *C08L 15/00* (2013.01); *C08L 91/00* (2013.01); *C08L 91/06* (2013.01); *C08F 8/08* (2013.01)

(58) Field of Classification Search
None
See application file for complete search history.

(56) References Cited

U.S. PATENT DOCUMENTS

| | | |
|---|---|---|
| 3,305,515 A | 2/1967 | Thomas, Jr. |
| 4,219,627 A | 8/1980 | Halasa et al. |
| 5,034,470 A * | 7/1991 | Geiser .................. C07F 11/005 |
| | | 525/332.8 |
| 5,310,819 A | 5/1994 | Roland et al. |
| 5,449,718 A | 9/1995 | Erickson et al. |
| 5,747,598 A | 5/1998 | Coolbaugh et al. |
| 5,789,512 A | 8/1998 | Fan et al. |
| 6,455,655 B1 | 9/2002 | Colvin et al. |
| 6,716,925 B2 | 4/2004 | Thielen et al. |
| 6,903,164 B2 | 6/2005 | Yabui et al. |
| 2002/0077427 A1 | 6/2002 | Hideyuki |
| 2004/0116613 A1 | 6/2004 | Yabui |
| 2008/0300367 A1 | 12/2008 | Patil |
| 2014/0378619 A1 | 12/2014 | Sakaki et al. |
| 2015/0031840 A1 | 1/2015 | Miyazaki |
| 2017/0190217 A1 * | 7/2017 | Joseph ....................... C08L 7/00 |

FOREIGN PATENT DOCUMENTS

| | | |
|---|---|---|
| CN | 103910816 A | 7/2014 |
| EP | 0624601 B1 | 8/1997 |
| EP | 0922718 A1 | 6/1999 |
| EP | 1348718 B1 | 12/2009 |
| EP | 2 530 094 A1 | 12/2012 |
| WO | 9828338 A1 | 7/1998 |

OTHER PUBLICATIONS

Schloman, Low Molecular Weight Guayule Natural Rubber as a Feedstock for Epoxidized Natural Rubber, Industrial Crops and Products 1 (1992) pp. 35-39. (Year: 1992).*
EP 17 77 9622, Extended European Search Report, dated Nov. 20, 2019.
Kurusu, et al., "Reactivity and microstructure of epoxidation of polybutadiene", *Polymer Journal*, Society of Polymer Science, Tokyo, JP, v. 26, No. 10, Oct. 15, 1994, pp. 1163-1169.
Huang, et al., "Epoxidation of polybutadiene and styrene-butadiene triblock copolymers with monoperoxyphthalic acid: kinetic and conformation study", *Journal of Polymer Science: Part A: Polymer Chemistry*, John Wiley & Sons, Inc., v. 26, No. 7, Jul. 1988, pp. 1867-1833.
D. C. Edwards et al., "Interaction of Silica With Functionalized SBR*'", Polysar Limited, Sarnia, Ontario N7T 7M2, Canada, pp. 66-79.
Georges Thielen, "Chemically Modified Emulsion SBR's in Tire Treads", Rubber Division of the American Chemical Society, Inc., Cleveland, OH, Oct. 16-18, 2007, ISSN: 1547-1977, pp. 1-15.

* cited by examiner

*Primary Examiner* — David J Buttner
(74) *Attorney, Agent, or Firm* — Fay Sharpe LLP

(57) ABSTRACT

A process for forming an epoxidized rubber including dissolving a rubber in a solvent and epoxidizing the rubber in the presence of an epoxidation reagent. The solvent is selected such that the rubber is soluble therein but the epoxidized rubber precipitates.

15 Claims, No Drawings

PROCESS FOR PRODUCING EPOXIDIZED POLYMERS

BACKGROUND

The present disclosure relates to a method for the preparation of epoxidized polymers. It finds particular application in conjunction with a solvent based process yielding self-precipitation of the epoxidized polymers, and will be described with particular reference thereto. However, it is to be appreciated that the present exemplary embodiment is also amenable to other like applications.

Procedures exist for the epoxidation of polymers via either latex or solvent processes. However, these existing procedures do not provide for self-precipitation of the epoxidized polymers.

U.S. 2015/0031840, herein incorporated by reference, describes a method for producing epoxidized rubber including: step (1) reacting an acid anhydride with hydrogen peroxide to prepare an organic peracid; and step (2) epoxidizing a natural rubber latex with the obtained organic peracid.

U.S. Pat. No. 5,789,512, herein incorporated by reference, describes a solvent based process using hydrogen peroxide in the presence of (a) tungstic acid or its metal salts, (b) phosphoric acid or its metal salts, and (c) at least one phase transfer catalyst to epoxidize unsaturated polymers. Exemplary solvents include chlorinated hydrocarbons, ethers, glycol ethers, hydrocarbons, and combinations thereof. Particularly suitable organic solvents are toluene, chlorobenzene, chloroform, methylene chloride, heptane, and the like.

U.S. Pat. No. 5,449,718, herein incorporated by reference, teaches that epoxidation of a base polymer can be effected by generally known methods such as reaction with organic peracids. Suitable peracids include peracetic and perbenzoic acids. In situ formation of the peracid may be accomplished by using hydrogen peroxide and formic acid. Alternatively, hydrogen peroxide in the presence of acetic acid or acetic anhydride and a cationic exchange resin can form the peracid. The cationic exchange resin can optionally be replaced by a strong acid such as sulfuric acid or p-toluenesulfonic acid.

Epoxidation may also be accomplished by treatment of the polymer with oxidants such as hydroperoxides or hypochlorite in the presence of transition metals such as Mo, W, Cr, V and Ag. One example of such a reaction is the epoxidation of olefins with manganese salen complexes and sodium hypochlorite in methylene chloride (Jacobsen-Katsuki reaction; see J. Am. Chem. Soc. 112(7), pp 2801-2803, 1990). The epoxidation reaction can be conducted directly in the polymerization cement (polymer solution in which the polymer was polymerized) or, alternatively, the polymer can be redissolved in an inert solvent such as toluene, benzene, hexane, cyclohexane, methylene chloride and the like and epoxidation conducted in the new solution.

In each case, the epoxidized polymer is recovered post-reaction either through the addition of coagulation promoters or through subjection to a heat treatment. In the case of the latex process, typical coagulation promoters are calcium chloride, formic acid, acetic acid, ketones, alcohols, or a combination thereof. In the case of the solvent process, typical coagulation promoters are ketones, alcohols, or a combination thereof. In the case of the latex process, a typical heat treatment comprises heating the solution beyond the cloud point of the surfactant and passing steam through the latex solution. In the case of the solvent process, the typical heat treatments comprise steam stripping of the solvent.

Accordingly, these processes require either the use of extra chemicals which must be isolated and/or disposed of post reaction or the introduction of added energy such as heat. Therefore, a need exists for an epoxidation process which minimizes the need for post-epoxidizing separation steps.

BRIEF DESCRIPTION

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

According to a first embodiment, a process for forming an epoxidized rubber is provided. The process involves dissolving a rubber in a solvent and epoxidizing the rubber in the presence of an epoxidation reagent having an aqueous phase pH in the range of 1.5 to 7.0. The solvent and reaction conditions are selected such that the rubber is soluble therein and the epoxidized rubber precipitates.

According to a second embodiment, a process for forming an epoxidized polymer is provided. The process comprises dissolving a diene containing polymer in a solvent selected from pentane, hexane, heptane, and mixtures thereof, and epoxidizing the polymer in the presence of an epoxidation agent. The epoxidation agent is selected from peracetic and performic acid. The epoxidation is performed at a pH between about 1.5 and 5.5 in (i) a temperature range of about $-20°$ C. to $35°$ C. at substantially atmospheric pressure or (ii) a temperature range of between about $-20°$ C. to $80°$ C. at elevated pressure.

Accordingly to a further embodiment, a process for epoxidizing a polymer is disclosed. The process includes the steps of dissolving a solid polymer compound in a solvent and reacting the dissolved polymer with an oxidant in the presence of a catalyst. The solvent is selected such that the polymer is soluble in the solvent and the epoxidized polymer precipitates from the solvent.

DETAILED DESCRIPTION

This disclosure describes a solvent-based methodology for the epoxidation of solvent-soluble polymers. This disclosure relates to a specific process in which the epoxidized polymer precipitates during the reaction, greatly simplifying the separation of the epoxidized polymer from the reaction medium.

One benefit of this disclosure is to provide a methodology to prepare epoxidized polymers through a solvent-based process that involves self-precipitation of the epoxidized polymers. The term "self-precipitation" signifies that the epoxidized polymer precipitates out of solution without the assistance of other chemicals or changes in conditions (such as temperature, pressure, or agitation). More particularly, the reaction conditions are not required to be modified to cause the precipitation. Rather, the transformation of the polymer to a sufficiently epoxidized state is the root cause of the precipitation event.

The present process is contemplated for use in association with polymers such as polybutadienes, polyisoprene, styrene-butadiene block copolymers, EPDM, butyl rubber, unsaturated polyesters and the like. In addition to these solvent-soluble unsaturated polymers, the process is suitable for use with natural rubbers derived from plant materials including, but not limited to, guayule plant (*Parthenium argentatum*), gopher plant (*Euphorbia lathyris*), mariola (*Parthenium incanum*), rabbitbrush (*Chrysothamnus nauseosus*), milkweeds (*Asclepias* L.), goldenrods (*Solidago*), pale Indian plantain (*Cacalia atripilcifolia*), rubber vine (*Crypstogeia grandiflora*), Russian dandelions (*Taraxacum kok-saghyz*), mountain mint (Pycnanthemum *incanum*), American germander (*Teucreum canadense*) and tall bellflower (*Campanula americana*).

According to one requirement of the present disclosure, the epoxidized polymer will be a "solid" at the reaction temperature. In this context, solid polymers include materials that deform elastically in response to an applied force, but exclude materials in a liquid state. Exemplary polymers include guayule natural rubber having a molecular weight of at least about 1,000,000 and polybutadienes having a molecular weight of at least 400,000.

It is generally desirable that the starting polymer is soluble in a solvent such as an aliphatic solvent. Accordingly, polymers such as *Heavea brasiliensis* which have high gel content may not be particularly suitable. However, it is noted that the sol fraction of a solution of such high gel content polymer may be suitable. For example, a *Hevea brasiliensis* polymer could be swollen in an aliphatic solvent and the dissolved polymer portion subjected to the epoxidation procedures of the present disclosure.

In accord with a first step of the subject process, the polymer can be dissolved in a solvent. Examples of solvents suitable for performing the subject epoxidation reaction include aliphatic solvents. Exemplary aliphatic solvents can include n, iso- and cyclo-alkanes. More specific examples include butane, cyclohexane, n-pentane, cycloheptane, methylcyclohexane, nonane and mixtures thereof. C5-C6 compounds may be particularly suitable.

As an example, the solid content of the polymer dissolved solution will be between about 1 wt % and about 20 wt %. This range is provided based on an assumption that the system is at room temperature. Variations in temperature can alter the obtainable solids content. For example, at an elevated temperature a solids content up to about 25 wt % is feasible, depending on the polymer.

After (or before) dissolving of the polymer in the solvent, an epoxidation reagent is added. As used herein, the phrase "epoxidation reagent" is intended to encompass the collection of agents that work in combination to initiate the epoxidation reaction in the polymer.

Epoxidation reagents suitable for use in the subject process include any peracid or in situ prepared peracids such as performic and peracetic acids. The peracid can constitute between about 0.5 wt. % and about 5.0 wt. % of the epoxidation solution. The peracid epoxidation reagent can be prepared by reacting an acid anhydride with hydrogen peroxide to prepare an organic peracid or by reaction of an organic acid with hydrogen peroxide in the present of a strong acid or in the case of formic acid mixing formic acid with hydrogen peroxide.

Suitable examples thereof include organic acid anhydrides represented by the formula: RC(O)O(O)CR where R is the same or different and each represents an optionally substituted hydrocarbon group.

Examples of the optionally substituted hydrocarbon group R include aliphatic hydrocarbon groups, aromatic hydrocarbon groups, and alicyclic hydrocarbon groups. The hydrocarbon group R preferably has 1 to 6 carbon atoms, more preferably 1 to 4 carbon atoms, and still more preferably 1 or 2 carbon atoms. Examples of the substituents include any of hydrocarbon groups and halogen groups.

Specific examples of the acid anhydride include aliphatic carboxylic anhydrides such as acetic anhydride, propionic anhydride, isobutyric anhydride, butyric anhydride, 2-methylbutyric anhydride, pivalic anhydride, isovaleric anhydride, valeric anhydride, 2-methylvaleric anhydride, 3-methylvaleric anhydride, 4-methylvaleric anhydride, hexanoic anhydride, 2-methylhexanoic anhydride, 3-methylhexanoic anhydride, 4-methylhexanoic anhydride, 5-methylhexanoic anhydride, heptanoic anhydride, 2-methylheptanoic anhydride, 3-methylheptanoic anhydride, 4-methyiheptanoic anhydride, 5-methylheptanoic anhydride, 6-methylheptanoic anhydride, 3-phenylpropionic anhydride, phenylacetic anhydride, methacrylic anhydride, acrylic anhydride, trichloroacetic anhydride, trifluoroacetic anhydride, tetrahydrophthalic anhydride, succinic anhydride, maleic anhydride, itaconic anhydride, and glutaric anhydride; and aromatic carboxylic anhydrides such as benzoic anhydride, phthalic anhydride, trimellitic anhydride, pyromellitic anhydride, and naphthalic anhydride. These may be used alone or in combination of two or more.

Examples of peracids, which could be used in the epoxidation reaction include performic, peracetic, perbenzoic, meta-perchlorobenzoic, perpropionic, and perbutyric. In the preparation of many peracids other than formic acid, a strong acid catalyst such as sulfuric acid may be needed to facilitate peracid formation. It is advantageous in the present process to neutralize the strong acid prior to conducting the epoxidation reaction with certain polymers because the strong acid could otherwise open the epoxide ring structure leading to undesirable side reactions.

The hydrogen peroxide is not particularly limited. For example, it may be any commercially available hydrogen peroxide aqueous solution. The concentration of the hydrogen peroxide aqueous solution is not particularly limited.

The method for reacting an acid anhydride with hydrogen peroxide is not particularly limited as long as it allows these components to be brought into contact with each other and reacted. For example, the method may include mixing an acid anhydride and hydrogen peroxide together to form an organic peracid. More specifically, an acid anhydride such as acetic anhydride is mixed with hydrogen peroxide. Advantageously, an organic peracid can be synthesized at a low temperature in a short time.

Preferably, 0.05 to 5 moles of hydrogen peroxide are added per mole of acid anhydride; more preferably, 0.1 to 2 moles of hydrogen peroxide are added in view of safety and efficiency. An amount less than 0.05 moles may result in a significant reduction in the conversion of the acid anhydride and is thus uneconomical. Also, an amount more than 5 moles may result in a significant reduction in the conversion of hydrogen peroxide and is thus uneconomical.

Alternatively, the epoxidation reagent may be a metalbased catalyst/peroxide systems. The metal-based catalyst/peroxide can constitute between about 0.5 wt. % and about 10.0 wt. % of epoxidation solution. In such a system, hydrogen peroxide solution is used as oxidant in a concentration in water of about 5 to 70% by weight. The amount of hydrogen peroxide can vary depending on the desired degree of epoxidation, typically about 0.1 to 1.5 equivalent per equivalent of double bonds to be epoxidized.

Tungstic acid which is not water soluble and its metal salts which are soluble are examples of a suitable metal catalyst. The typical catalyst is used in amounts of about 0.005 to 1%, based on weight of unsaturated compound.

The epoxidation reagent may further include a phase transfer catalyst in amounts of about 0.001 to 1, equivalents per equivalent of carbon-carbon double bond. Suitable phase transfer catalysts includes quaternary ammonium salts, quaternary phosphonium salts, polyethers, and the like. Examples of phase transfer catalysts include, for example, trioctylmethylammonium chloride, trioctylmethylammonium bromide, trioctylmethylammonium iodide, trioctylmethylammonium hydrogen sulfate, trioctylmethylammonium nitrate, tetrahexylammonium chloride, tetrahexylammonium bromide, tetrahexylammonium iodide, tetrahexylammonium hydrogen sulfate, tetrahexylammonium nitrate, tetrabutylammonium chloride, tetrabutylammonium bromide, tetrabutylammonium nitrate, tetrabutylammonium hydrogen sulfate, dioctadecyldimethylammonium chloride, dioctadecyldimethylammonium bromide, dioctadecyldimethylammonium nitrate, dioctadecyldimethylammonium hydrogen sulfate, dihexadecyldimethylammonium chloride, dihexadecyldimethylammonium bromide, dihexadecyldimethylammonium nitrate, dihexadecyldimethylammonium hydrogen sulfate, trioctylmethylphosphonium chloride, trioctylmethylphosphonium bromide, trioctylmethylphosphonium nitrate, trioctylmethylphosphonium hydrogen sulfate, tetrahexylphosphonium chloride, tetrahexylphosphonium bromide, tetrahexylphosphonium nitrate, tetrahexylphosphonium hydrogen sulfate, tetrabutylphosphonium chloride, tetrabutylphosphonium bromide, tetrabutylphosphonium nitrate, tetrabutylphosphonium hydrogen sulfate, tetrabutylphosphonium iodide, dioctadecyldimethylphosphonium chloride, dioctadecyldimethylphosphonium bromide, dioctadecyldimethylphosphonium nitrate, dioctadecyldimethylphosphonium hydrogen sulfate, dihexadecyldimethylphosphonium chloride, dihexadecyldimethylphosphonium bromide, dihexadecyldimethylphosphonium nitrate, dihexadecyldimethylphosphonium hydrogen sulfate, tetraalkylammonium hydroxide, tetraalkylammonium tribromide, tetraalkylammonium trifluoromethanesulfonate, and any combination thereof.

The epoxidation reagent could alternatively constitute the salen complexes of Jacobsen-Katsuki reaction. In fact, in its broadest interpretation, the epoxidation reagent of the present disclosure is intended to include any compounds capable of causing formation of an epoxy group on the identified polymer(s) when dissolved in the identified solvents.

The term "epoxidation ratio" is defined as the ratio of reacted unsaturation divided by the initial amount of unsaturation. According to the subject process, it is desirable to achieve an epoxidation ratio of at least about 20 mol % to about 95 mol %.

The term "precipitation point" refers to the minimum epoxidation ratio necessary for precipitation to begin. It has been found that the present process can achieve a precipitation point at an epoxidation ratio of between about 15 mol % and about 70 mol % depending upon the selected polymer, solvent, temperature, and epoxidation reagent. For example, when using a solvent such an n-pentane, it is expected that the precipitation point at room temperature could be around 15 mol % for polyisoprene. However, if the polarity of the solvent is modified by adding a more polar solvent, the precipitation point could be raised to a level such as about 70%.

Moreover, the precipitation point is dictated by both polymer and solvent solubility parameters. The solubility parameters provide a numerical estimation of the miscibility of two or more materials based on the energies from dispersion and intramolecular forces, and hydrogen bonding. The precipitation point can be adjusted by changing the solvent composition. For example, in the case of epoxidized Guayule natural rubber (soluble cis-1,4-polyisoprene) and n-pentane, the precipitation point is about 15% epoxidation content. In the case of epoxidized Guayule natural rubber and hexanes, the precipitation point is about 24% epoxidation content. In the case of epoxidized Guayule natural rubber and Exxsol D80 solvent (de-aromatized aliphatic hydrocarbon solvent; initial boiling point about 180° C.), the precipitation point is about 28%.

Furthermore, by adjusting the temperature of the system, the precipitation point can be changed (there is a higher precipitation point at high temperature and lower precipitation point at low temperature). Generally speaking, the isolation temperature is below the boiling point of the solvent and ideally is room temperature. Moreover, room temperature may be preferred to reduce degradation of the polymer. However, since the epoxidation reaction is exothermic, some increase in temperature from its starting point is expected. Reflux of the solvent may be used to control temperature.

Advantageously, the desired precipitation point can be "dialed in" by the skilled artisan by tailoring these variables.

It is noted that the resultant precipitated epoxidized polymer will still contain a fraction of solvent (i.e. they may be swollen). Generally speaking, the higher the epoxidation content, the less solvent remaining in the precipitate as more polar polymers force out solvent. In this regard, the precipitated epoxidized polymer may be 2 to 3 times its dry weight. These solids can be isolated by filtration, centrifugation or other known techniques for isolating solids from liquids.

It should also be noted that precipitation can occur before epoxidation of the polymer is complete. For example, precipitation could occur at 15% epoxidation, with epoxidation continuing to a higher level (e.g. 25%) in the swollen precipitate.

It is further contemplated that the pH of the reaction system can be of importance. Moreover, in the case of peracetic acid as the epoxidation reagent, it may be desirable to perform a pH adjustment (for example via buffer addition) from its typical pH below 1 to a pH range of about 3.5 and 5.5 for the epoxidation reaction. An exemplary buffering agent is sodium bicarbonate. In the case of performic acid as the epoxidation reagent, reacting in a pH range of 1.5-3.5 can be acceptable. Moreover, conducting the epoxidation reaction in a pH range of between about 1.5 and 5.5 may be desirable to control opening of ring structures on the polymer reactants.

In considering the utility of the present self-precipitated epoxidized polymers, they are anticipated to provide significant benefits as they can be reactive with silica and/or be readily functionalized. For example, during the epoxidation of polyisoprene, both the epoxy and hydroxl functionality are present if the epoxidation is carried out with performic acid. Both of these functionalities are useful for use with compounds containing silica because these groups can interact with the hydroxyl groups on the surface of the silica. Such interactions are also known for hydroxy-functionalized SBR which can be prepared by terpolymerization of styrene, butadiene and hydroxypropyl methacrylate (HPMA). This enhanced interaction positively impacts the physicomechanical properties of resulting rubber compounds. Hydroxyl-functionalization increases the amount of insoluble rubber, the latter being an indicator of the interaction of the filler with the rubber matrix. Resultantly, this translates into reduced hysteresis. Tan δ peak broadening is also observed as a consequence of the augmented silica-bound rubber phase. Another observation is the improved abrasion resistance. Silica flocculation is significantly slowed by the presence of hydroxyl functionalization.

EXAMPLES

Example 1—Epoxidation of Guayule Natural Rubber with 20% Epoxidation Target

The epoxidation experiment was carried out in a 4 L vessel equipped with an overhead mechanical stirrer and a water cooled reflux condenser 181.40 g (2.596 mol of C≡C) of Guayule natural rubber was cut in small pieces and dissolved in about 2.7 L of n-pentane, yielding a rubber solution of approximately 9.8 wt % solid content. 118.59 g (0.519 mol) of peracetic acid solution from Sigma-Aldrich (acetic acid-sulfuric acid-water; 34.3 wt % aqueous solution), deionized water (120 mL) and 43.62 g of sodium bicarbonate (0.519 mol) were premixed (mixture pH 4-5) and the mixture was subsequently added to the polymer solution. The resulting biphasic system was then vigorously stirred at room temperature. The epoxidized Guayule natural rubber precipitated shortly after addition of the epoxidation reagent. The mixture was stirred for a total time of 2.5 hours after which the epoxidized polymer was allowed to settle. The epoxidized polymer was filtered, washed with several portions of deionized water with caustic agent to maintain the pH within the neutral range, and stabilized with about 1 phr BNX 8000. The finished epoxidized polymer was obtained after steam stripping and subsequent drying.

Example 2—Epoxidation of Guayule Natural Rubber with 20% Epoxidation Target

The epoxidation experiment was carried out in a 4 L vessel equipped with an overhead mechanical stirrer and a water cooled reflux condenser. 165.62 g (2.431 mol of C═C) of Guayule natural rubber was cut in small pieces and dissolved in about 2.7 L of n-pentane, yielding a rubber solution of approximately 8.9 wt % solid content. 109.93 g (2.102 mol) of formic acid (88 wt % aqueous solution) having a pH of 1-2 and 53.53 g (0.494 mol) of hydrogen peroxide (31.4 wt % aqueous solution) were added to the polymer solution. The resulting biphasic system was then vigorously stirred at room temperature. The mixture was stirred for a total time of 7 hours after which the epoxidized polymer was allowed to settle. The epoxidized polymer was filtered, washed with several portions of deionized water with caustic agent to maintain the pH within the neutral range, and stabilized with about 1 phr BNX 8000. The finished epoxidized polymer was obtained after steam stripping and subsequent drying.

Example 3—Epoxidation of Guayule Natural Rubber with 25% Epoxidation Target

The epoxidation experiment was carried out in a 4 L vessel equipped with an overhead mechanical stirrer and a water cooled reflux condenser. 150.00 g (2.202 mol of C═C) of Guayule natural rubber was cut in small pieces and dissolved in about 2.2 L of n-pentane, yielding a rubber solution of approximately 9.8 wt % solid content. 122.06 g (0.551 mol) of peracetic acid solution (34.3 wt % aqueous solution), deionized water (120 mL) and 46.29 g of sodium bicarbonate (0.551 mol) were premixed and the mixture was subsequently added to the polymer solution. The resulting biphasic system was then vigorously stirred at room temperature. The epoxidized Guayule natural rubber precipitated shortly after addition of the epoxidation reagent. The mixture was stirred for a total time of 2.5 hours after which the epoxidized polymer was allowed to settle. The epoxidized polymer was filtered, washed with several portions of deionized water with caustic agent to maintain the pH within the neutral range, and stabilized with about 1 phr BNX 8000. The finished epoxidized polymer was obtained after steam stripping and subsequent drying.

Example 4—Epoxidation of Guayule Natural Rubber with 30% Epoxidation Target

The epoxidation experiment was carried out in a 4 L vessel equipped with an overhead mechanical stirrer and a water cooled reflux condenser. 165.29 g (2.366 mol of C═C) of Guayule natural rubber was cut in small pieces and dissolved in about 2.7 L of n-pentane, yielding a rubber solution of approximately 8.9 wt % solid content. 152.12 g (0.686 mol) of peracetic acid solution (34.3 wt % aqueous solution), deionized water (150 mL) and 57.64 g of sodium bicarbonate (0.686 mol) were premixed and the mixture was subsequently added to the polymer solution. The resulting biphasic system was then vigorously stirred at room temperature. was subsequently added and the biphasic system was vigorously stirred at room temperature. The epoxidized Guayule natural rubber precipitated shortly after addition of the epoxidation reagent. The mixture was stirred for a total time of 2.5 hours after which the epoxidized polymer was allowed to settle. The epoxidized polymer was filtered, washed with several portions of deionized water with caustic agent to maintain the pH within the neutral range, and stabilized with about 1 phr BNX 8000. The finished epoxidized polymer was obtained after steam stripping and subsequent drying.

Example 5—Epoxidation of Guayule Natural Rubber with 100% Epoxidation Target

The epoxidation experiment was carried out in a 100 mL vessel equipped with a magnetic stirrer. 1.043 g (0.015 mol of C═C) of Guayule natural rubber was cut in small pieces and dissolved in about 28 mL of n-pentane, yielding a rubber solution of approximately 5.6 wt % solid content. 3.40 g (0.015 mol) of peracetic acid solution (34.3 wt % aqueous solution), deionized water (4 mL) and 1.260 g of sodium bicarbonate (0.015 mol) were premixed and the mixture was subsequently added to the polymer solution. The resulting biphasic system was then vigorously stirred at room temperature. The epoxidized Guayule natural rubber precipitated shortly after addition of the epoxidation reagent. The mixture was stirred for a total time of 6.0 hours after which the epoxidized polymer was allowed to settle. The epoxidized polymer was filtered, washed with several portions of deionized water with caustic agent to maintain the pH within the neutral range, and stabilized with about 1 phr BNX 8000. The finished epoxidized polymer was obtained after steam stripping and subsequent drying. Epoxidation content: 92% by $^1$H NMR.

Example 6—Epoxidation of Polybutadiene Rubber with 30% Target

The epoxidation experiment was carried out in a 100 mL vessel equipped with an overhead mechanical stirrer. 1.091 g (0.020 mol of C═C) of polybutadiene rubber was cut in small pieces and dissolved in about 34 mL of hexanes, yielding a rubber solution of approximately 4.7 wt % solid content. 1.35 g (0.006 mol) of peracetic acid solution (34.3 wt % aqueous solution), deionized water (1.5 mL) and 0.504 g of sodium bicarbonate (0.006 mol) were premixed and the mixture was subsequently added to the polymer solution. The resulting biphasic system was then vigorously stirred at room temperature. The epoxidized polybutadiene rubber precipitated within two hours after addition of the epoxidation reagent. The mixture was stirred for a total time of 7.0 hours after which the epoxidized polymer was allowed to settle. The epoxidized polymer was filtered, washed with several portions of deionized water with caustic agent to maintain the pH within the neutral range, and stabilized with about 1 phr BNX 8000. The finished epoxidized polymer was obtained after steam stripping and subsequent drying. Epoxidation content: 15% by $^1$H NMR.

Example 7—Peracetic Acid Epoxidation Reagent without pH Modification

The epoxidation experiment was carried out in a 250 mL vessel. 2.0 g (29.36 mmol of C═C) of Guayule natural rubber was cut in small pieces and dissolved in 65 g of pentane, yielding a rubber solution of approximately 3.0 wt % solids content. 1.63 g (7.34 mmol) of peracetic acid solution (34.3 wt % aqueous solution) epoxidation reagent was added without buffer. The pH of the peracetic acid solution was between 0 and 1. The resulting biphasic system was vigorously stirred at room temperature. The epoxidized Guayule natural rubber precipitated shortly after addition of the epoxidation reagent. A portion of the precipitated polymer was isolated and added to a large excess of methylene chloride. Most of the precipitated polymer did not dissolve in the methylene chloride, indicating gelation.

Example 8—Compounding

Compounded rubber compositions were prepared. An epoxidized natural rubber (ENR-25, available from Muang Mai Guthrie PCL) and an epoxidized Guayule natural rubber (EGNR-25, prepared per this invention) composition were each compounded in accord with the details set forth in the following table. The properties achieved for each compounded material is also set forth below.

|  | PHR | |
| --- | --- | --- |
| RECIPE | A | B |
| ENR-25 | 100.00 | 0.00 |
| EGNR-25 | 0.00 | 100.00 |
| Precipitated silica | 65.00 | 65.00 |
| Carbon black | 5.00 | 5.00 |
| Process oil | 10.00 | 10.00 |
| Coupling agents | 4.50 | 4.50 |
| Zinc oxide | 3.00 | 3.00 |
| Stearic acid | 2.00 | 2.00 |
| Stabilizers | 2.00 | 2.00 |
| Salt of stearic acid | 4.00 | 4.00 |
| Wax | 1.50 | 1.50 |
| Cure package | 6.50 | 6.50 |

Mixing Protocol
Non-Productive Pass
t=0 min: feed polymer, ½ silica, and other chemicals
t=1 min: feed oil and silane
t=1.5 min: feed ½ silica
t=3.5 min: drop at 260° F.

Productive Pass
t=0: add non-productive stock and cure package
t=2.5 min: drop at 210° F.

|  | RECIPE | |
| --- | --- | --- |
| PROPERTIES | A | B |
| Specific Gravity (g · cm$^{-3}$) | 1.203 | 1.201 |
| Mooney ML1+4 (212° F.) | 67 | 92 |
| Unaged Tensile Properties | | |
| Tensile Strength | 3432 | 3147 |
| 100% Modulus | 344 | 374 |
| 300% Modulus | 1606 | 1498 |
| Elongation | 550% | 555% |
| Aged Tensile Properties (72 h at 100° C.) | | |
| Tensile Strength | 2041 | 2382 |
| 100% Modulus | 718 | 704 |
| 300% Modulus | n/a | n/a |
| Elongation | 215% | 257% |

The present invention also relates to articles such as medical devices, belts, hoses and tires formed from the epoxidized polymer.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A process for forming an epoxidized polymer comprising dissolving a polymer in a solvent and epoxidizing said polymer in the presence of an epoxidation reagent having an aqueous phase pH in a range of 1.5 to 7.0, said epoxidation reagent comprising one or more peracid selected from the group consisting of peracetic, perbenzoic, meta-perachlorobenzoic, perpropionic and perbutyric, and a buffer, wherein said solvent and reaction conditions are selected such that a majority of the polymer is soluble in the solvent and a majority of the epoxidized polymer precipitates from the solvent.

2. The process of claim 1, wherein said polymer comprises a diene containing polymer.

3. The process of claim 1, wherein said solvent is selected from pentane, hexane, heptane and isomers thereof.

4. The process of claim 1, wherein said buffer comprises a bicarbonate.

5. The process of claim 1, wherein said peracetic acid comprises a solution having a pH range of about 2-3.

6. The process of claim 1, wherein the precipitated epoxidized polymer is collected by filtration.

7. The process of claim 1, wherein the polymer precipitates without the assistance of other chemicals or changes in conditions.

8. A process for forming an epoxidized polymer comprising dissolving a polymer in a solvent and epoxidizinq said polymer in the presence of an epoxidation reagent, wherein said epoxidation reagent comprises a metal based catalyst, peroxide and an acid, and wherein said solvent and reaction conditions are selected such that a majority of the polymer is soluble in the solvent and a majority of the epoxidized polymer precipitates from the solvent.

9. A process for forming an epoxidized polymer comprising dissolving a diene containing polymer in a solvent selected from pentane, hexane, heptane, and isomers thereof, and epoxidizing said polymer in the presence of a performic acid epoxidation agent, wherein the performic acid is directly introduced into the solvent containing the dissolved polymer, said epoxidizing being performed in (i) a temperature range of about −20° C. to 35° C. at substantially atmospheric pressure or (ii) a temperature range of between about −20° C. to 80° C. at elevated pressure, and wherein the epoxidized polymer precipitates from the solvent.

10. The process of claim 7, further including the addition of a buffer.

11. The process of claim 9, wherein said polymer is selected from guayule natural rubber, polyisoprene containing polymers, polybutadiene, butyl rubber and mixtures thereof.

12. The process of claim 11, wherein said polymer comprises guayule having a molecular weight of at least 1,000,000 or a polybutadiene having a molecular weight of at least 400,000.

13. The process of claim 9, wherein the precipitated epoxidized polymer is collected by filtration.

14. The process of claim 9, wherein or the performic acid is in the form of an aqueous solution having a pH range between about 1.5 and 5.5.

15. A process for forming an epoxidized polymer comprising dissolving a guayule natural rubber having a molecular weight of at least 1,000,000 or a polybutadiene polymer having a molecular weight of at least 400,000 in a solvent selected from pentane, hexane, heptane, and isomers thereof, and epoxidizing said polymer in the presence of an epoxidation agent selected from peracetic and performic acid, said epoxidizing being performed in (i) a temperature range of about −20° C. to 35° C. at substantially atmospheric pressure or (ii) a temperature range of between about −20° C. to 80° C. at elevated pressure, and wherein the epoxidized polymer precipitates from the solvent.

* * * * *